(12) United States Patent
Kandanchatha et al.

(10) Patent No.: US 7,966,499 B2
(45) Date of Patent: Jun. 21, 2011

(54) SYSTEM AND METHOD FOR OBSCURING BIT-WISE AND TWO'S COMPLEMENT INTEGER COMPUTATIONS IN SOFTWARE

(75) Inventors: Arun Narayanan Kandanchatha, Kanata (CA); Yongxin Zhou, Ottawa (CA)

(73) Assignee: Irdeto Canada Corporation, Ottawa, Ontario (CA)

( * ) Notice: Subject to any disclaimer, the term of this patent is extended or adjusted under 35 U.S.C. 154(b) by 1095 days.

(21) Appl. No.: 11/039,817

(22) Filed: Jan. 24, 2005

(65) Prior Publication Data

US 2005/0166191 A1    Jul. 28, 2005

(51) Int. Cl.
  *G06F 11/30* (2006.01)
  *G06F 12/14* (2006.01)
(52) U.S. Cl. ............... 713/190; 726/31; 726/32; 726/33
(58) Field of Classification Search .................. 713/190
  See application file for complete search history.

(56) References Cited

U.S. PATENT DOCUMENTS

| 3,872,442 | A | * | 3/1975 | Boles et al. | 708/204 |
| 4,852,057 | A | * | 7/1989 | Patton | 708/136 |
| 5,301,345 | A | * | 4/1994 | Skruhak et al. | 712/223 |
| 5,907,640 | A | * | 5/1999 | Delean | 382/276 |
| 6,009,252 | A | * | 12/1999 | Lipton | 716/112 |
| 6,286,135 | B1 | * | 9/2001 | Santhanam | 717/146 |
| 6,668,325 | B1 | * | 12/2003 | Collberg et al. | 713/194 |

* cited by examiner

*Primary Examiner* — Kambiz Zand
*Assistant Examiner* — Dant B Shaifer Harriman
(74) *Attorney, Agent, or Firm* — Leslie A. Kinsman; Borden Ladner Gervais LLP

(57) ABSTRACT

Systems and methods related to concealing mathematical and logical operations in software. Mathematical and logical operations are disguised by replacing them with logically equivalent expressions. Each equivalent expression has at least two expression constants whose values are based on scaling and bias constants assigned to variables in the original mathematical or logical operation. Each of the expression constants may also be based on additive or multiplicative inverses modulo n of the scaling and bias constants. By replacing the original operations with more complex but logically equivalent expressions containing variables that also involve more operations, the true nature of the original operations is disguised.

22 Claims, 2 Drawing Sheets

SYSTEM AND METHOD FOR OBSCURING BIT-WISE AND TWO'S COMPLEMENT INTEGER COMPUTATIONS IN SOFTWARE

FIELD OF THE INVENTION

The present invention relates to software that is resistant to unauthorized analysis. More specifically, the present invention relates to methods and systems for the production of software code that disguises operations such that analysis of the code either during run-time or during an attempt of reverse engineering is made more difficult.

BACKGROUND TO THE INVENTION

Software analysis for unauthorized purposes is old. Since the personal computer came of age, and perhaps even before that time, hackers and crackers have been analyzing software to subvert the software writer's goals. In one well-known scenario, dynamic software tracing (tracing the logic flow of a program as the program executes) has been used to determine which values or registers need to be adjusted to allow full functioning of a program. Patches or hacks (small and usually unauthorized programs designed to work with only one specific application) are then written to ensure that those values or registers provide the correct values. Similarly, the program may also be hacked by amending the source code to allow unrestricted access to the program.

These and other similar methods based on analyzing a program's source code may be used for purposes that range from the benign to the malicious. Software may be analyzed to allow hackers to develop ways to circumvent a copy protection scheme, cheat at game programs, or defeat requirements for hardware security checks. Similarly, such analysis may be used to allow hackers to defeat anti-virus software, software based firewalls, or to gain access to restricted functions or databases.

The basis for such attacks on software stems from the fact that most software decisions are based on mathematical operations and comparisons. As such, if the true nature of these operations and comparisons can be hidden in the code such that it is more difficult to analyze the code, hackers may be deterred from trying such attacks. Or, if they are not deterred from trying such measures, hackers may find the analysis too tedious or convoluted to succeed.

Based on the above, there is therefore a need for systems and methods that can obfuscate, hide, disguise, or otherwise conceal the true nature of mathematical operations and comparisons in software.

SUMMARY OF THE INVENTION

The present invention provides systems and methods related to concealing arithmetic and logical operations in software. Arithmetic and logical operations are disguised by replacing them with logically equivalent expressions. Each equivalent expression has at least two expression constants whose values are based on scaling and bias constants assigned to variables in the original arithmetic or logical operation. Each of the expression constants may also be based on additive or multiplicative inverses modulo n of the scaling and bias constants. By replacing the original operations with more complex but logically equivalent expressions containing variables that also involve more operations, the true nature of the original operations is disguised.

In a first aspect, the present invention provides a computer implemented method for transforming a software program from an original form to a more secure form by disguising an operation contained in said software program, said operation having at least one variable, the method comprising:

a) identifying said operation to be disguised in said program;

b) assigning a predetermined bias constant and a predetermined scaling constant to at least one of said at least one variable;

c) determining an equivalent expression logically equivalent to said operation, said equivalent expression having at least two expression constants, each of said at least two expression constants being based on at least one factor selected from a group comprising:

said scaling constant (s) for one of said at least one variable;

said bias constant (b) for one of said at least one variable;

an additive inverse modulo n (b−1) of said bias constant where said additive inverse modulo n is the value for b−1 where (b+b−1) mod n=0;

a multiplicative inverse modulo n ($s^{-1}$) of said scaling constant where said multiplicative inverse modulo n is the value for $s^{-1}$ where ($s*s^{-1}$) mod n=1, d) transforming said software program into a more secure software program by replacing said operation with said equivalent expression in said software program.

In a second aspect, the present invention provides a computer program product, comprising a computer usable medium having a computer readable program code tangibly embodied therein, said computer readable program code adapted to be executed to implement a system for transforming a software program from an original form to a more secure form by disguising at least one operation contained in a software program, the at least one of said operations having at least one variable, the system comprising:

an identification module for identifying said at least one operation in said software program;

a conversion module for converting said at least one operations into a logically equivalent expression based on an identification of said operations by said identification module; and a replacement module for replacing said at least one operations with said equivalent expression, wherein for each variable in said at least one operation, said variable is assigned a scaling constant and a bias constant.

In a third aspect, the present invention provides a computer implemented method of transforming a software program from an original form to a more secure form by disguising a plurality of operations contained in a source code of said software program, the method comprising:

a) determining which operations in said source code are to be disguised;

b) selecting predetermined equivalent expressions to be used in place of said operations, said equivalent expressions being logically equivalent to said operations to be disguised wherein each variable in each of said operations is assigned a scaling constant and a bias constant;

c) transforming said software program into a more secure software program by replacing each of said operations in said source code with said equivalent expressions.

BRIEF DESCRIPTION OF THE DRAWINGS

A better understanding of the invention will be obtained by considering the detailed description below, with reference to the following drawings in which.

DETAILED DESCRIPTION

Figure 1:
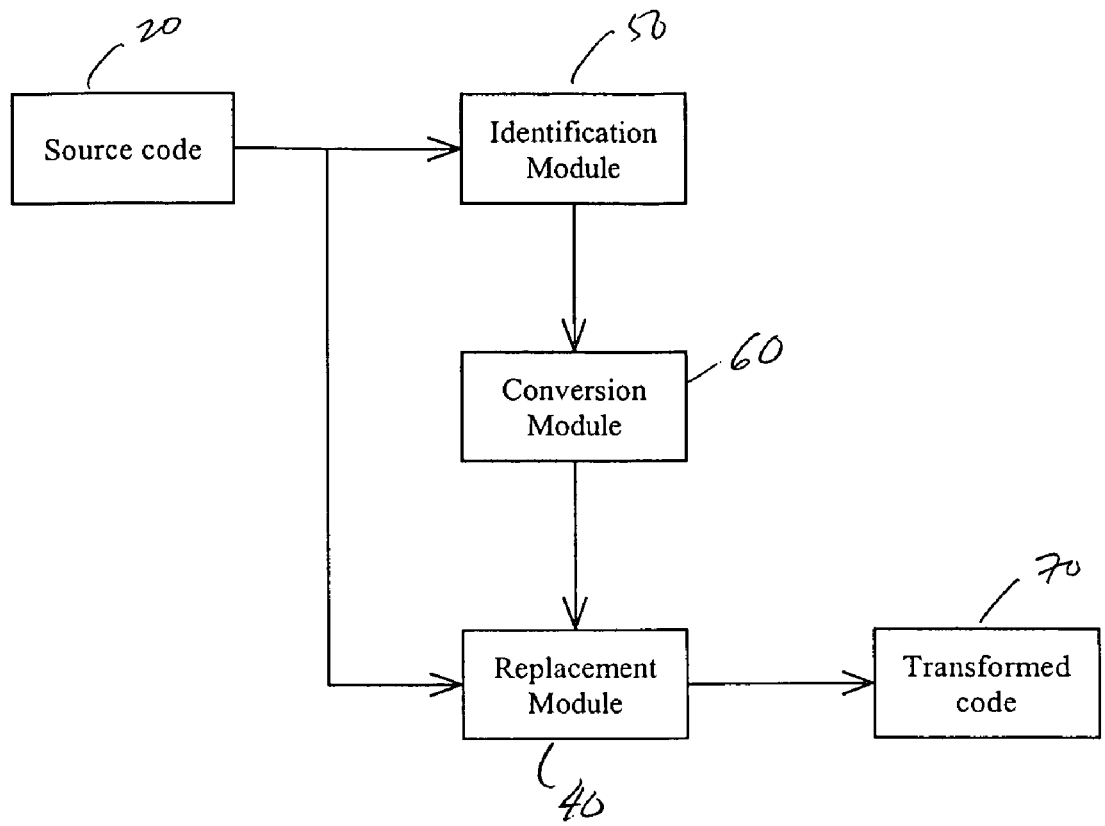
FIG. 1 is a block diagram of a system according to one aspect of the invention.

The invention makes use of linear transformations to disguise or "hide" the original intent of a arithmetic, logical, or bitwise operation. A linear transformation substitutes a more complex expression for a simple one. As an example, a variable x can be disguised by assigning $x'=s_x x+b_x$ with $s_x$ being a random scaling factor and $b_x$ being a random bias factor. The variable x, instead of being a simple variable, now becomes $$x = \frac{x' - b_x}{s_x}.$$

To illustrate how linear transformations may be used to disguise arithmetic, logical, or bitwise operations, an example will be given. We can assume $z=x*y$. If we assign random scaling and bias factors to each of the variables x, y, and z, such that $$x'=s_x x+b_x$$

$$y'=s_y y+b_y$$

$$z'=s_z z+b_z$$

then $$x = \frac{x' - b_x}{s_x}, \quad y = \frac{y' - b_y}{s_y}.$$

This is done by isolating the variable x and y from its linear transforms. All scaling factors ($s_x$, $s_y$, and $s_z$) and bias factors ($b_x$, $b_y$, and $b_z$) are assumed to be randomly selected by the user.

Since $z'=s_z z+b_z$ and $z=x*y$, then $z'=s_z(x*y)+b_z$. Since $$x = \frac{x' - b_x}{s_x}$$

and $$y = \frac{y' - b_y}{s_y},$$

then $$z' = s_z\left[\left(\frac{x' - b_x}{s_x}\right)*\left(\frac{y' - b_y}{s_y}\right)\right]+bz.$$

To simplify the algebra and for the purposes of the example, we can assume $s_x=3$, $b_x=5$, $s_y=9$, $b_y=8$, $s_z=7$, and $b_z=4$. Thus, after substituting the proper values, $$z' = 7\left[\left(\frac{x'-5}{3}\right)*\left(\frac{y'-8}{9}\right)\right]+4$$

However, linear transformation by itself only provides very weak obfuscation as the linear equations can easily be solved. This weakness can be rectified by moving the linear transforms to a finite ring domain using modular arithmetic.

Modular arithmetic can best be analogized to a "remainder" system. Modular operations can be summarized by its equivalent—the result of x mod n is the remainder after dividing x by n and after discarding the whole number result. As an example, 21 mod 10 results in 1 as 21 divided by 10 equals 2 with a remainder of 1. Once the whole number result, 2, is discarded, then the remainder, 1, is left. Similarly, 15 mod 5 equals 0 as 15 is exactly divisible by 5. 17 mod 5, on the other hand, equals 2 as 17 divided by 5 equals with a remainder of 2. Thus, x mod n is the whole number remainder after x is divided by n.

It should be noted that the above explanation of modular arithmetic is only provided for clarity and ease of understanding. Applying a finite ring implementation to linear transforms effectively "wraps" original numbers a number of times around a circular domain or ring, much like in modular arithmetic. In modular arithmetic, as in a finite ring domain, the domain can be seen as a circle with n−1 elements—with n−1 being succeeded by 0. As such, a count around the circle progresses as . . . n−3, n−2, n−1, 0, 1, 2, . . . . By using a linear transform with a finite ring implementation, the finite ring linear transform $f(x)=s_x x+b_x$ mod n behaves like a hash function and thereby greatly disguises or obscures the real value of the original variable x. This form of transform is resistant to linear forms of analysis and, if the scaling factor $s_x$ is large, the analysis needed to reverse engineer the finite ring arithmetic and transform is dauntingly complex.

An added feature of finite ring arithmetic is that it does not distinguish between signed and unsigned arithmetic. In mathematical terms, as opposed to the division hardware based modulus operation, −x in twos complement form (with the sign bit of 1 as a magnitude bit) already has the proper representation as x mod n where n is the hardware modulus. Thus, all finite ring arithmetic is done unsigned but can represent both unsigned and signed arithmetic.

As noted above and to return to our example, we can complicate matters and thereby further disguise the original intent of the original arithmetic function $z=x*y$ by applying modular arithmetic can be applied to the above equation. Thus, instead of subtracting 5 from x' or subtracting 8 from y', the additive inverse mod n of 5 and 8 can be added to x' and y' respectively. Similarly, instead of dividing by 3 and 9 respectively, we can multiply the expression by the multiplicative inverse mod n of 3 and 9 respectively.

It should be noted that the additive inverse modulo n ($b^{-1}$) of a number b is the value of $b^{-1}$ for which $(b+b^{-1})$ mod n=0. Similarly, the multiplicative inverse modulo n ($s^{-1}$) of a number s is the value $s^{-1}$ for which $(s*s^{-1})$ mod n=1. For n=256, the additive inverse of 5 is 251 as (5+251) mod 256=0. For n=256, the multiplicative inverse of 3 is 171 as (3*171) mod 256=1.

Returning to the example prior to the simplification, we had $$z' = s_z\left[\left(\frac{x'-b_x}{s_x}\right)*\left(\frac{y'-b_y}{s_y}\right)\right] + bz.$$

Applying the multiplicative inverse mod n and the additive inverse modulo n, we arrive at $$z'=(s_z[(x'+b_x^{-1})*s_x^{-1}*(y'+b_y^{-1})*s_y^{-1}]+bx) \bmod n.$$

This expands to $$z'=((s_zs_x^{-1}s_y^{-1})x'y'+(s_zs_x^{-1}b_y^{-1}s_y^{-1})x'+(s_zs_y^{-1}b_x^{-1}s_x^{-1})y'+(s_zb_x^{-1}s_x^{-1}b_y^{-1}s_y^{-1}+bz)) \bmod n$$

Since we know the values for all the scaling and bias factors (see above) we only need a value for n. If we assume n=256 (a number selected for simplicity), then we can find the additive and multiplicative inverses of the scaling and bias factors along with the values for the factors themselves required by the equation. These values are:

| | | | |
|---|---|---|---|
| $s_x = 3$ | $b_x = 5$ | $s^{-1}_x = 171$ | $b^{-1}_x = 251$ |
| $s_y = 9$ | $b_y = 8$ | $s^{-1}_y = 57$ | $b^{-1}_y = 248$ |
| $s_z = 7$ | $b_z = 4$ | | |

The above equation, using these values, simplifies to $$z'=133x'y'+216x'+103y'+204.$$

The coefficients were formed by replacing the corresponding variable coefficients with their numeric values as follows:

$$133=[7(171)(57)] \bmod 256$$

$$216=[7(171)(248)(57)] \bmod 256$$

$$103=[7(57)(251)(171)] \bmod 256$$

$$204=[(7(251)(171)(248)(57)+4)] \bmod 256$$

It should be noted that if an 8-bit computer implementation of the final equation is contemplated, then the mod 256 can be dropped as the 8-bit character of the computer will cause the variables to overflow. As such, the original operation of z=x*y has now been transformed into $$z'=133x'y'+216x'+103y'+204.$$

Since we know that $$x'=s_xx+b_x=3x+5$$

$$y'=s_yy+b_y=9y+8$$

$$z'=133x'y'+216x'+103y'+204$$

values can be assigned to the variables when executing the code. As an example of the disguising quality of the above transformation, if the original variables were assigned values as below, then the registers would have as their contents:

| Original code | Register value |
|---|---|
| x = 20 | 20 |
| y = 10 | 10 |
| z = x * y | 200 |

The transformed code would produce the following values:

| Transformed code | Register value |
|---|---|
| x' = 65 | 65 |
| y' = 98 | 98 |
| z' = 133x'y' + 216 x' + 103y' + 204 | 124 |

As can be seen, the register values for the transformed expression are quite different from the values for the original variables and equations. Not only that, but the original operation of a simple multiplication has now been transformed into a more complex collection of operations that involve multiple multiplications and additions.

It should be noted that while n=256 was selected for simplicity, in implementations, other values of n may be selected for convenience, keeping in mind the hardware to be used. As an example, $2^{32}$ is the most convenient value for n for implementations on 32 bit hardware. Similarly, $2^{16}$ is the convenient choice for 16 bit hardware and $2^{64}$ is the convenient choice for n for implementations on 64 bit hardware. The reasoning for this is the same as given above for an 8-bit implementation with n=256—the mod $2^n$ can be dropped from the equivalent expression as the n-bit character of the hardware will cause the variables to overflow. The overflow will cause the count to "wrap around" a numerical circle such that the end result is the same as that of dividing by the modulus and taking the remainder. As an example, for an 8-bit computer, the value for n is ideally 256 as this is the value for $2^8$. Overflow for an 8-bit computer will thus cause a count to be . . . 251, 252, 253, 254, 255, 0, 1, 2, 3 . . . . The count thus "wraps around" after 255 back to 0. As a result, the n-bit character of the hardware automatically produces the correct result, modulo n when n is the hardware register modulus.

Based on the above example, any arithmetic or logical function in the source code of a computer program can be replaced with a logically equivalent expression. From the example above, the expression z=x*y in source code can be replaced by its logical equivalent z'=133x'y'+216 x'+103y'+ 204. Each of the coefficients in the equation for z' may be based on the scaling and bias factors assigned to the original variables x, y, and z. Not only that, but each of the coefficients may also be based on the additive inverse modulo n or the multiplicative inverse modulo n of these scaling and bias factors.

To obtain better obfuscation, the scaling factor s should be relatively prime to the modulus n. This means that the scaling factor should have no prime factor in common with the modulus n other than 1. Given that current hardware has moduli that are powers of 2 (e.g. $2^8$, $2^{32}$, $2^{64}$), then this means that for implementations using binary hardware, the scale factor should be an odd number. The reasoning behind this is that if the scale is an even number and the modulus is a power of two (e.g. $2^{32}$, $2^{16}$, $2^{64}$), then we are left with representations for only k/2 distinct numbers instead of k distinct numbers. This reduces the efficiency of the implementation and reduces the ambiguity which the attacker must overcome. It should therefore be clear that the use of odd values for the scaling factor is the preferred implementation for binary hardware. The choice of a bias factor, on the other hand, has no restrictions.

It should be noted that while each variable in the original arithmetic operation is assigned a scaling factor s and a bias factor b (e.g. $x'=s_xx+b_x$), other variants may be used to introduce further complexity. Furthermore, as an aid to converting arithmetic and logical operations to their logically equivalent expressions, identities may be used. As an example, for bit-wise functions, the expression may be expanded. For illustrative purposes, the bitwise operation z=x OR y (written as z=x|y in the source code) can be rewritten as z=y−1−((−x−1)|y). Using such expressions as these and following the general concept outlined in the above example, any bitwise function or operation can be transformed into a logically equivalent expression with multiple constants. Thus, any arithmetic operation, logical operation, or bitwise operation can, using any of a number of identities and the general approach used above, be turned into a myriad of equivalent expressions.

As further examples of the identities and the formats for the equivalent expressions that may be used, the following table lists some logical and bitwise operations, identities which may be used, and possible formats for the resulting equivalent expressions. It should be noted that u and v are linear transforms based on the original variables x and y the same way x' is a linear transform based on x (e.g. $x'=s_x x+b_x$). a, b, c, d, e, f, g, and h are constants based on the constants in the linear transforms u and v.

| Bitwise/Logical Operation | Identity | Equivalent Expression Format |
|---|---|---|
| NOT (~)<br>z = ~x | ~x = − 1 − x | a * u + b |
| XOR (^)<br>z = x ^ y | z = x + y + 1 + ((− 2 * x − 1)\|(− 2 * y − 1)) | a * u + b * v + c + d * ((e * u + f)\|(g * v + h)) |
| AND (&)<br>z = x & y | z = 1 + x + ((− x − 1)\|y) | a * u + b + c * ((d * u + e)\|(f * v + g)) |
| OR (\|)<br>z = x\|y | z = y − 1 − ((− x − 1)\|y) | a * v + b + c * ((d * u + e)\|(f * v + g)) |
| Signed Shift Left (<<)<br>z = x << y | z = − ((− x − 1) << y) − (1 << y) | a * ((b * u + c) << (d * v + e)) + a * ( 1 << (d * v + e) + f |
| Signed Shift Right (>>)<br>z = x >> y | z = − ((− x − 1) >> y) − 1 | e * ((a * u + b) >> (c * v + d)) + f |

It should be further noted that the equivalent expressions into which the original function is transformed will depend upon a number of elements. Specifically, the choice of the random scaling and bias factors will influence the final value of the coefficients in the equivalent expression. Also, the choice of the identity used to convert logical or bitwise operations will influence the form and content of the final equivalent expression. Because of the dependency of the final expression on such user (i.e. the code generator) selected elements, the final expression used to replace a function in a piece of source code is not easily determinable by someone analyzing the code.

To automate the process of replacing the relevant arithmetic, logical, or bitwise operations in a piece of source code, a system may be devised with a number of modules as illustrated in FIG. 1.

In the system illustrated in FIG. 1, the source code 20 of a software program is received by an identification module 50 and a replacement module 40. The identification module 50 identifies the section of the source code containing the arithmetic, logical, or bitwise operation to be disguised. Once the section is identified, the type of operation is also identified and this identification is sent to a conversion module 60. The conversion module 60 then selects a suitable equivalent expression with the appropriate coefficients and sends this to the replacement module 40. The replacement module 40 receives the equivalent expression and replaces the relevant piece of code in the source code with this expression. The transformed code 70 is the source code with the relevant section replaced by the equivalent expression.

The identification module 50 may take the form of well-known parser software used in the development of applications such as compilers. Such parsers can receive strings of alphanumeric characters and, by isolating specific segments of such strings, can recognize sequences of alphanumeric characters as corresponding to specific arithmetic, logical, or bitwise operations. Once identified, the specific operation and any coefficients associated with it can be passed to the conversion module 60.

The conversion module 60 can be implemented in a number of ways depending on the end user's preferences. Ideally, the conversion module 60 has a library of equivalent expressions for each operation to be disguised. The expressions in the library are previously derived and are available for selection by the conversion module. As an example, an operation may correspond to 3 different equivalent expressions, each equivalent expression being different in terms of form and content/coefficients from the others. Similarly, another option would be to have each operation correspond to a single equivalent expression with multiple coefficients. Each of the coefficients can then be made different every time the operation needs to be disguised. As an example, we can assume that an operation z+x*y may be disguised as z'=ax'y'+bx'+cy'+d with a, b, c, and d as constant coefficients. Every time the operation z=x*y occurs in the original source code, it can be replaced by the same equivalent expression z'=ax'y'+bx'+cy'+d but with different values for a, b, c, and d. As yet another option, the equivalent expressions may be stored by the conversion module 60 not as finished expressions where the coefficients are integers but as nested formulas to be executed during run-time. An expression such as z'=133x'y'+216 x'+130y'+204 may then be stored as z'=[[7(171)(57)] mod 256]x'y'+[[7(171)(248)(57)] mod 256]x'+[[7(57)(251)(171)] mod 256]y'+[[(7 (251)(171)(248)(57)+4)] mod 256]

with the arithmetic expressions in the brackets being evaluated when the code is run.

Once the conversion module 60 has determined the proper equivalent expression to be used in disguising the operation identified by the identification module 50, this equivalent expression is then transferred to the replacement module 40. The replacement module 40 then, from the data received from the identification module 50 by way of the conversion module 60, finds the relevant section of the source code where the substitution is to occur. The equivalent expression is then placed in lieu of the original operation in the source code.

The transformed code 70 that results may therefore have expressions that have coefficients that are either specific integers or are arithmetic expressions themselves. The replacement of the relevant operations by their equivalent expressions may be on a per-value and per-operation basis. Thus, as an example, even though one operation f(x) is used numerous times in a piece of source code, for each instance that f(x) occurs, a different equivalent expression with different coefficients may be used. It should, however, be noted that if a particular subroutine is called or accessed multiple times from outside the specific set of code, a given parameter in that subroutine is always encoded the same way for consistency. This, however, is an exceptional case and is not the default action.

The above-noted and explained scheme works at disguising the true nature of the operations by rendering both dynamic and static tracing difficult. An attacker who keeps track of the register values and of the compiled code as it executes must necessarily try to figure out the complex and numerous arithmetic and logical operations that have now been substituted for even the simplest of operations. Since the transformed code is what was complied and is being examined by the attacker, both static and dynamic tracing will yield similarly difficult results for the attacker.

In terms of functionality, if the above scheme is applied to some source code, the transformed code resulting will produce different results from the original source code. However, these different results will contain the same information as the original results from the original source code, albeit in a disguised form. The reasoning behind this is that all the operations in the transformed code will have been disguised and transformed and, as such, will be producing output and will be expecting input that are both transformed as well. The only exception to this would be sections of code that are required to output a readable result or read-in a readable parameter. All other sections of the source code are to be disguised or are to undergo a transformation to hide or disguise their true nature.

It should be noted that the above scheme may be used in conjunction with the methods and systems disclosed in U.S. Pat. No. 6,594,761 entitled TAMPER RESISTANT SOFTWARE ENCODING, herein incorporated by reference.

Figure 2:
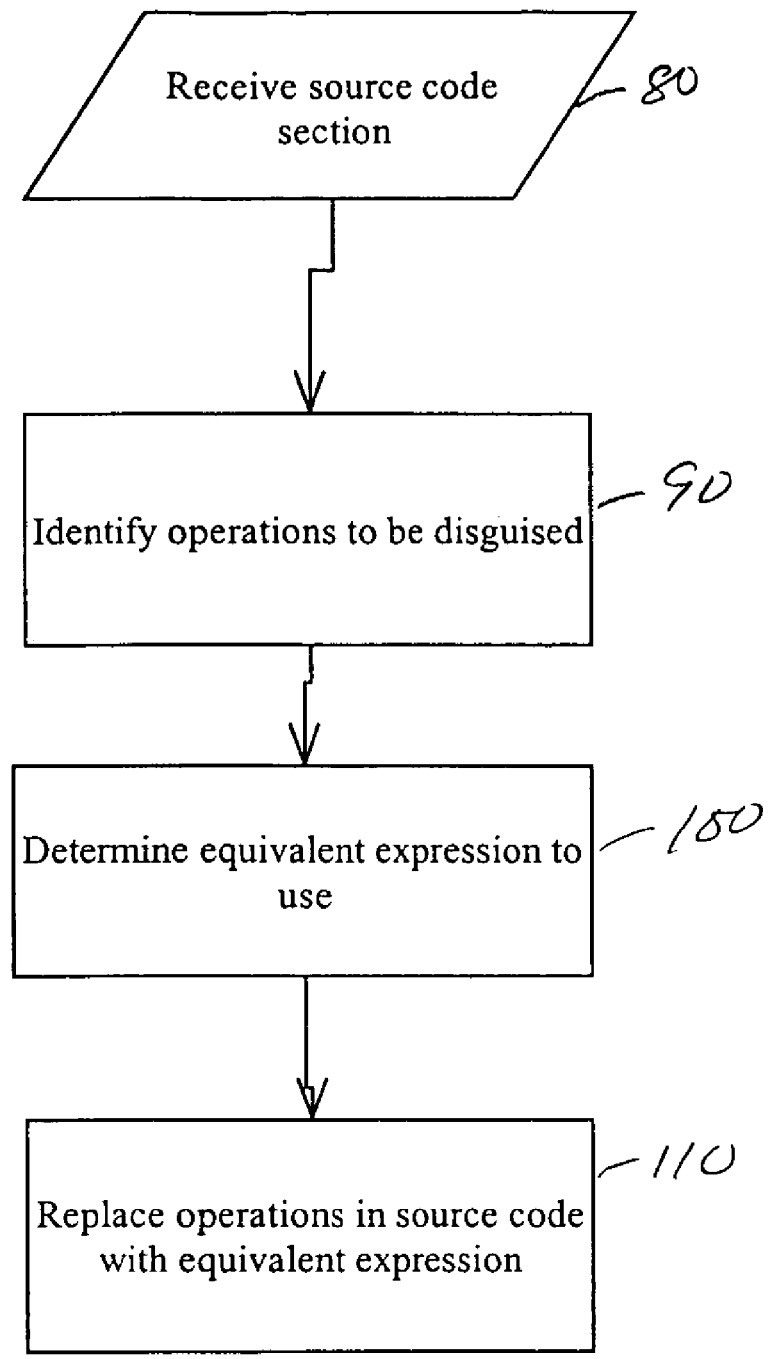
FIG. 2 is a flowchart illustrating the steps executed by the system of FIG. 1.

Referring to FIG. 2, the main steps of the scheme explained above are illustrated. The method begins at step 80, that of receiving or reading in at least a section of source code. This source code is then analyzed and the sections containing operations to be disguised are identified in step 90. Also in this step, the types of operations to be disguised in the section of code are also identified. Once properly identified, the equivalent expressions for the operations to be disguised are determined (step 100). With the equivalent expressions found, the final step (step 110) is that of substituting the equivalent expressions for the operations to be disguised.

It should also be noted that the step of assigning a multi-variable expression to each variable in an operation is an implicit step that is not shown in FIG. 2. This step assigns an expression with, as an example, a scaling constant and a bias constant to each variable. Since the scaling and bias constant are user selected or randomly assigned, the expression assigned to each variable may be seen as a multi-variable expression.

Embodiments of the invention may be implemented in any conventional computer programming language. For example, preferred embodiments may be implemented in a procedural programming language (e.g. "C") or an object oriented language (e.g. "C++"). Alternative embodiments of the invention may be implemented as pre-programmed hardware elements, other related components, or as a combination of hardware and software components.

Embodiments can be implemented on a tangible computer readable medium for use with a computer system. Such implementation may include a series of computer instructions fixed on the tangible computer readable medium (e.g., a diskette, CD-ROM, ROM, or fixed disk). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices. It is expected that such a tangible computer readable medium may be distributed as a removable medium with accompanying printed or electronic documentation (e.g., shrink wrapped software), or preloaded with a computer system (e.g., on system ROM or fixed disk). Of course, some embodiments of the invention may be implemented as a combination of both software and hardware. Still other embodiments of the invention may be implemented as entirely hardware.

A person understanding this invention may now conceive of alternative structures and embodiments or variations of the above all of which are intended to fall within the scope of the invention as defined in the claims that follow.

We claim:

1. A computer implemented method for transforming a software program from an original form to a more secure form by disguising an operation contained in said software program, said operation having at least one variable, the method comprising:
   a) identifying by a computer said operation to be disguised in said program;
   b) assigning by the computer a randomly chosen bias constant and a randomly chosen scaling constant to each variable in said identified operation;
   c) determining by the computer an equivalent expression logically equivalent to said operation, said equivalent expression having at least one variable and at least two expression constants, each of said at least two expression constants being based on at least one factor dependent on said randomly chosen scaling constant (s) assigned to one of said at least one variable and said randomly chosen bias constant (b) assigned to one of said at least one variable, and at least one of an additive inverse modulo n ($b^-1$) of said bias constant where said additive inverse modulo n is the value for $b^-1$ where $(b+b^-1)$ mod n=0, and a multiplicative inverse modulo n ($s^-1$) of said scaling constant where said multiplicative inverse modulo n is the value for $s^-1$ where $(s*s^-1)$ mod n=1;
   d) transforming by the computer said software program into a more secure software program by replacing said operation with said equivalent expression in said software program.

2. A method according to claim 1 wherein said operation is an arithmetic operation.

3. A method according to claim 1 wherein said operation is a bitwise operation.

4. A method according to claim 1 wherein step c) is accomplished by selecting said equivalent expression from a database.

5. A method according to claim 1 wherein said software program is a part of a larger program.

6. A method according to claim 1 wherein said scaling constant and said bias constant assigned to a variable is different from another scaling constant and another bias constant assigned to said variable in another section of said software program.

7. A non-transitory computer usable medium having a computer readable program code tangibly embodied therein, said computer readable program code adapted to be executed to implement a system for transforming a software program from an original form to a more secure form by disguising at least one operation contained in a software program, the at least one of said operations having at least one variable, the medium comprising:

- an identification module for identifying said at least one operation in said software program to be disguised, said at least one operation having at least one variable, said at least one variable being assigned a randomly chosen bias constant and a randomly chosen scaling constant;
- a conversion module for converting the at least one of said operations into a logically equivalent expression having at least one variable based on an identification of said operations by said identification module, wherein said equivalent expression has at least two expression constants, each of said at least two expression constants being based on at least one factor dependent on said randomly chosen scaling constant (s) assigned to one of said at least one variable and said randomly chosen bias constant (b) assigned to one of said at least one variable, and at least one of an additive inverse modulo n ($b^{-1}$) of said bias constant where said additive inverse modulo n is the value for $b^{-1}$ where $(b+b^{-1})$ mod n=0, and a multiplicative inverse modulo n ($s^{-1}$) of said scaling constant where said multiplicative inverse modulo n is the value for $s^{-1}$ where $(s*s^{-1})$ mod n=1; and
- a replacement module for replacing the at least one of said operations with said equivalent expression.

8. A non-transitory medium according to claim 7 wherein said conversion module retrieves said equivalent expression from a predetermined database.

9. A non-transitory medium according to claim 7 wherein said at least one operation is an arithmetic operation.

10. A non-transitory medium according to claim 7 wherein said at least one operation is a bitwise operation.

11. A non-transitory medium according to claim 7 wherein said at least one operation is a logical operation.

12. A computer implemented method of transforming a software program from an original form to a more secure form by disguising a plurality of operations contained in a source code of said software program, the method comprising:

a) determining by a computer which operations in said source code are to be disguised;
b) selecting by the computer predetermined equivalent expressions to be used in place of said operations, said equivalent expressions being logically equivalent to said operations to be disguised and having at least one variable, wherein each variable in each of said operations is assigned a randomly chosen scaling constant and a randomly chosen bias constant, wherein at least one of said equivalent expressions has at least one variable and at least two expressions constants and wherein at least one of said expression constants is based on at least one factor dependent on said randomly chosen scaling constant (s) assigned to one of said at least one variable and said randomly chosen bias constant (b) assigned to one of said at least one variable, and at least one of an additive inverse modulo n ($b^{-1}$) of said bias constant where said additive inverse modulo n is the value for $b^{-1}$ where $(b+b^{-1})$ mod n=0, and a multiplicative inverse modulo n ($s^{-1}$) of said scaling constant where said multiplicative inverse modulo n is the value for $s^{-1}$ where $(s*s^{-1})$ mod n=1;
c) transforming by the computer said software program into a more secure software program by replacing each of said operations in said source code with said equivalent expressions.

13. A method according to claim 12 wherein at least one of said operations is an arithmetic operation.

14. A method according to claim 12 wherein at least one of said operations is a bitwise operation.

15. A method according to claim 12 wherein said equivalent expressions are selected from a database.

16. A method according to claim 1 wherein said operation is a logical operation.

17. A method according to claim 12 wherein said predetermined equivalent expressions are based on at least one linear transform applied to variables used by said operations.

18. A method according to claim 17 wherein said predetermined equivalent expressions are further based on finite ring implementations of said linear transforms.

19. A non-transitory medium according to claim 7 wherein each scaling constant is odd.

20. A non-transitory medium according to claim 7 wherein a modulus n and each scaling constant have a single common factor, said single common factor being 1.

21. A method according to claim 1 wherein each scaling constant is odd.

22. A method according to claim 1 wherein a modulus n and each scaling constant have a single common factor, said single common factor being 1.

* * * * *